US009822920B2

(12) United States Patent
Lai

(10) Patent No.: US 9,822,920 B2
(45) Date of Patent: Nov. 21, 2017

(54) TURNTABLE WITH LIGHT TRANSMISSION ROUND PLATTER AND LIGHT COLLECTION SPINDLE

(71) Applicant: Ortery Technologies, Inc., New Taipei (TW)

(72) Inventor: Peng-Cheng Lai, Los Altos, CA (US)

(73) Assignee: Ortery Technologies, Inc., Irvine, CA (US)

( * ) Notice: Subject to any disclaimer, the term of this patent is extended or adjusted under 35 U.S.C. 154(b) by 304 days.

(21) Appl. No.: 14/678,433

(22) Filed: Apr. 3, 2015

(65) Prior Publication Data
US 2016/0291446 A1    Oct. 6, 2016

(51) Int. Cl.
| G03B 15/02 | (2006.01) |
| F16M 11/00 | (2006.01) |
| G03B 15/06 | (2006.01) |
| G03B 15/07 | (2006.01) |
| G03B 37/02 | (2006.01) |
| F21V 33/00 | (2006.01) |

(52) U.S. Cl.
CPC ............ *F16M 11/00* (2013.01); *G03B 15/06* (2013.01); *G03B 15/07* (2013.01); *G03B 37/02* (2013.01); *F21V 33/0036* (2013.01)

(58) Field of Classification Search
USPC .............................................. 362/16–18, 35
See application file for complete search history.

(56) References Cited

U.S. PATENT DOCUMENTS

| 2012/0003659 | A1* | 1/2012 | Yoo | G01N 21/07 435/6.12 |
| 2012/0177350 | A1* | 7/2012 | Jancourtz | F16M 11/08 396/5 |
| 2015/0167921 | A1* | 6/2015 | Gollier | F21V 5/002 362/326 |
| 2015/0279251 | A1* | 10/2015 | Matyear | H02S 40/38 362/183 |

* cited by examiner

*Primary Examiner* — Allyson Trail

(57) ABSTRACT

A turntable with a light transmission round platter and at least one light collection spindle is provided. The light transmission round platter connects to the light collection spindle, and the light collection spindle is driven by a motor to rotate the light transmission round platter. A portion of surface of the light collection spindle is frosted. The incident light from a bottom or a lateral side is collected in a light collection area of the spindle and then transmitted toward a conjunctive area of the light transmission round platter via a transparent and smooth light guiding area, so as to lighten the originally dark conjunctive area and reduce the darkness thereof. Accordingly, the time spent in background removal of the dark conjunctive area can be reduced since the conjunctive area is lighted when the light transmission round platter is rotated for photographing an object to be photographed thereon.

15 Claims, 17 Drawing Sheets

TURNTABLE WITH LIGHT TRANSMISSION ROUND PLATTER AND LIGHT COLLECTION SPINDLE

BACKGROUND OF THE INVENTION

1. Field of the Invention

The present invention relates to a turntable, particularly to a turntable with a light transmission round platter and a light collection spindle, wherein the light transmission round platter is connected to a light collection spindle via a conjunctive area, and wherein incident light from the bottom or lateral side may be collected by a frosted portion of the surface of the light collection spindle and travel through the original smooth and transparent portion of the surface of the light collection spindle which is functioned as a light guiding area so as to lighten the conjunctive area.

2. Description of the Prior Art

The round platter of a turntable is usually made of metal, plastic, wood, glass or other hard materials, as a conventional turntable illustrated in to FIG. 1. In FIG. 1, a round platter 1 of the turntable is connected to a spindle 2 of the turntable by a screw 3. A motor 4 then rotates a gear chamber 6 via a coupling device 5 and further via spindle holder 7 holding the spindle 2 so as to drive the round platter 1 to rotate. The above-mentioned components are enclosed by a box 8. Support rollers may also be arranged underneath the round platter 1. The round platter 1 may be arranged within the box 8 or exposed from the top side of the box 8.

A turntable capable of turning at various angles is utilized in taking 360 degree photography, hemispherical or spherical 3D photography to generate huge amount of still images. Then, those still images with pure-white-background or automatic background removal are generated before creating 3D animation or a 3D model so as to save time in removing background. The light transmission round platter is common used for assisting in taking photography and may be made of plastic or glass that are transparent or translucent. Generally, a plurality of pulleys are held against each rim of the light transmission round platter and drive the centerless light transmission round platter to rotate.

In FIG. 2, the centerless light transmission round platter 9 is equipped with a bottom light or a back light lower than the round platter 9. The timing pulleys 10 and 11 is in contact with the rim of a centerless light transmission round platter 9 from at the right side, and idlers 12 and 13 is also in contact with the centerless light transmission round platter 9 from the left side. Plastic rolling balls 14, 15, 16 and 17 are utilized to support the bottom of the centerless light transmission round platter 9 near an edge. The timing pulleys 10 and 11 are entangled with a timing belt 18. A motor 19 drives the timing belt 18 as well as the timing pulleys 10 and 11 to rotate the centerless light transmission round platter 9. The upper edges of the timing pulleys 10 and 11 and the idlers 12 and 13 are respectively sleeved with rubber rings directly contacting the centerless light transmission round platter 9. Each of the lower edges of the timing pulleys 10 and 11 is sleeved by the timing belt 18. Refer to FIG. 3, which is a diagram schematically showing a conventional turntable with a centerless light transmission round platter driven by several motors. In FIG. 3, rubber rollers 21, 22 and 23 are held against the rim of a centerless light transmission round platter 20 in different directions. Motors 24, 25 and 26 simultaneously drive the rubber rollers 21, 22 and 23 to rotate, and the centerless light transmission round platter 20 to rotate. The bottom of the centerless light transmission round platter 20 near an edge is supported by plastic rolling balls 27, 28 and 29. The turntable in FIG. 4 is basically similar to that in FIG. 1 except that the round platter in FIG. 4 has a light source 30 thereon and is covered by a translucent cover 31. Thus, pure-white-background images or the background removal images of the object to be photographed on the translucent cover 31 may be automatically generated. Refer to FIG. 5, which is a diagram schematically showing a conventional turntable with a light transmission round platter 32, a transparent spindle 33 and a bottom light 34. The turntable in FIG. 5 is basically similar to that in FIG. 1, except that a light transmission round platter 32 is utilized and connected to a transparent spindle 33. Further, a light source 34 is arranged under the light transmission round platter 32. The bonding between the light transmission round platter 32 and the transparent spindle 33 may be achieved by gluing or plastic injection forming a one-piece component. However, the transparent spindle 33 is not frosted and the transparent spindle 33 is unlikely to concentrate the light emitted by the light source 34 to lighten the dark spot area 35 of the light transmission round platter 32, resulted in dark area in generated images if the dark spot area 35 is not covered by the object to be photographed.

In FIG. 2 and FIG. 3, rubber rings or rubber rollers are used for holding against the rim of the light transmission round platter from different directions, driving the light transmission round platter to rotate in a centerless manner. Although there is no dark area during photography, slight slip still takes place during synchronous driving with the rubber rings/rubber rollers holding against the rim of the light transmission round platter. Further, it is hard to guarantee a perfect round rotation without slip and a precise rotation radius as the rubber rings/rubber rollers are simultaneously pressed. Therefore, the turntables shown in FIG. 2 and FIG. 3 need calibrating to correct the rotation angle thereof. However, rotation errors still occur in such a case. In FIG. 4, a light source and a translucent cover are placed on a round platter of a common turntable. Slips may take place between the translucent cover and the round platter when the turntable starts or stops rotating. Besides, it is difficult for the translucent cover to carry a heavier object to be photographed. Further, as the light source rotates together with the round platter, power cannot be supplied to the rotating light source continuously and stably. The turntable shown in FIG. 5 has no problems on such slips and inaccurate rotation of the turntables in FIG. 2 and FIG. 3, and discontinuous power supply of the light source on the turntable in FIG. 4. Although the dark conjunctive area is generated due to the binding between the light transmission round platter and the transparent spindle, it can be solved by adding another translucent platter onto the light transmission round platter. However, the light collection spindle of the present invention may lighten the dark conjunctive area and solve the problem more effectively.

Refer to FIG. 6 a diagram schematically showing a conventional turntable with a light transmission round platter, a transparent spindle and a side light. The turntable in FIG. 6 is basically similar to the turntable in FIG. 5 except the light source is a side light in FIG. 6 rather than a bottom light in FIG. 5.

SUMMARY OF THE INVENTION

One objective of the present invention is to provide a turntable, having a motor driving a light collection spindle through a spindle holder and then rotating a light transmission round platter connected to the light collection spindle. The objects to be photographed is placed on the light transmission round platter during photography for generating 2D or 3D still images with pure-white-background or automatic background-removal so as to save time in background removal.

Another objective of the present invention is to directly drive a light collection spindle held by a spindle holder with a motor and further drive a light transmission round platter connected to the light collection spindle so as to prevent the light transmission round platter from slips or erroneous turning angles in start or stop.

To achieve the above-mentioned objectives, a portion of the surface of the light collection spindle according to the present invention is processed with a frosting treatment so as to collect the incident light from the bottom or the lateral side and incident to the frosted area of the light collection spindle. The collected light is further guided to a smooth and transparent portion of the original surface of the light collection spindle and then reflected to the dark conjunctive area between the light transmission round platter and the light collection spindle to lighten the conjunctive area. Thereby, the images are exempted from the dark spot areas in photography. The frosting treatment includes at least one of grinding the light collection spindle with sandpaper, grinding the light collection spindle with a grinding wheel, sandblasting the light collection spindle, and sandblasting the mold of the light collection spindle.

The embodiments are described in detail in cooperation with the attached drawings to make easily understood the characteristics and advantages of the present invention.

BRIEF DESCRIPTION OF THE DRAWINGS

The foregoing aspects and many of the accompanying advantages of this invention will become more readily appreciated as the same becomes better understood by reference to the following detailed descriptions, when taken in conjunction with the accompanying drawings, wherein.

DESCRIPTION OF THE PREFERRED EMBODIMENT

Figure 1:
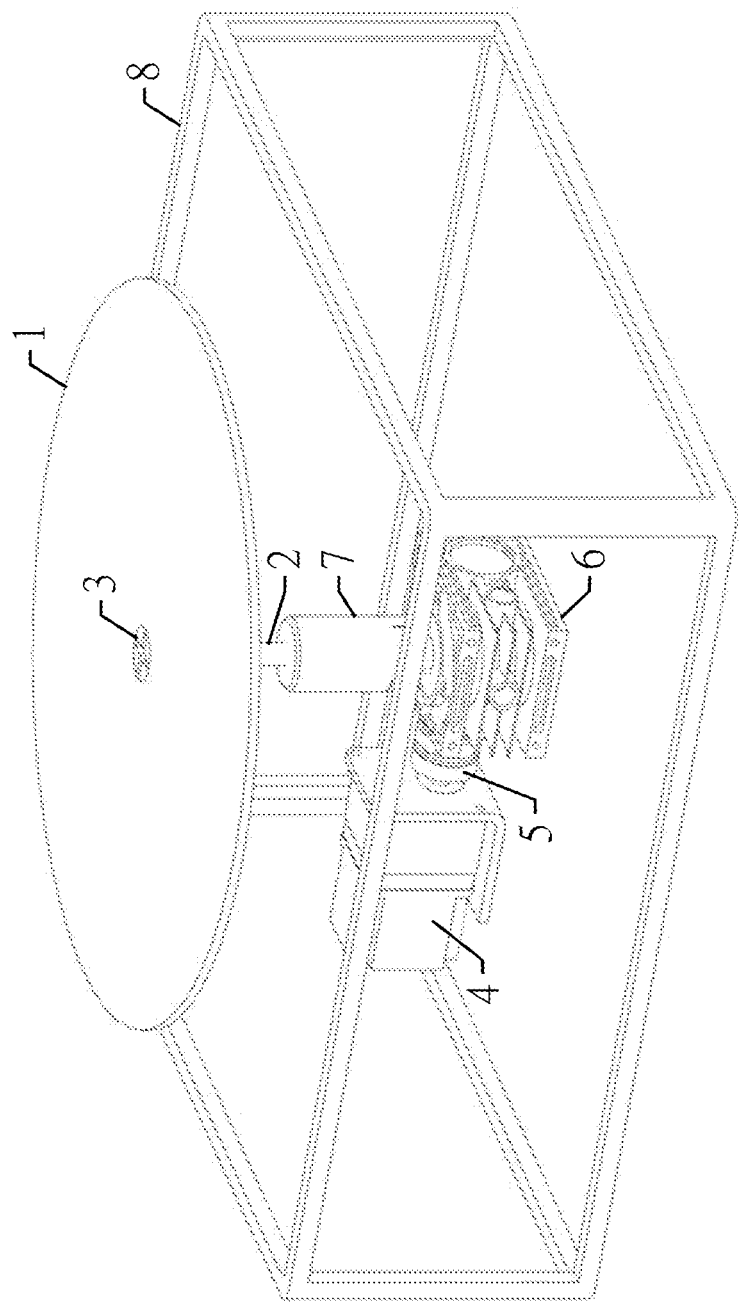
FIG. 1 is a diagram schematically showing a common turntable in the conventional technology.
Figure 2:
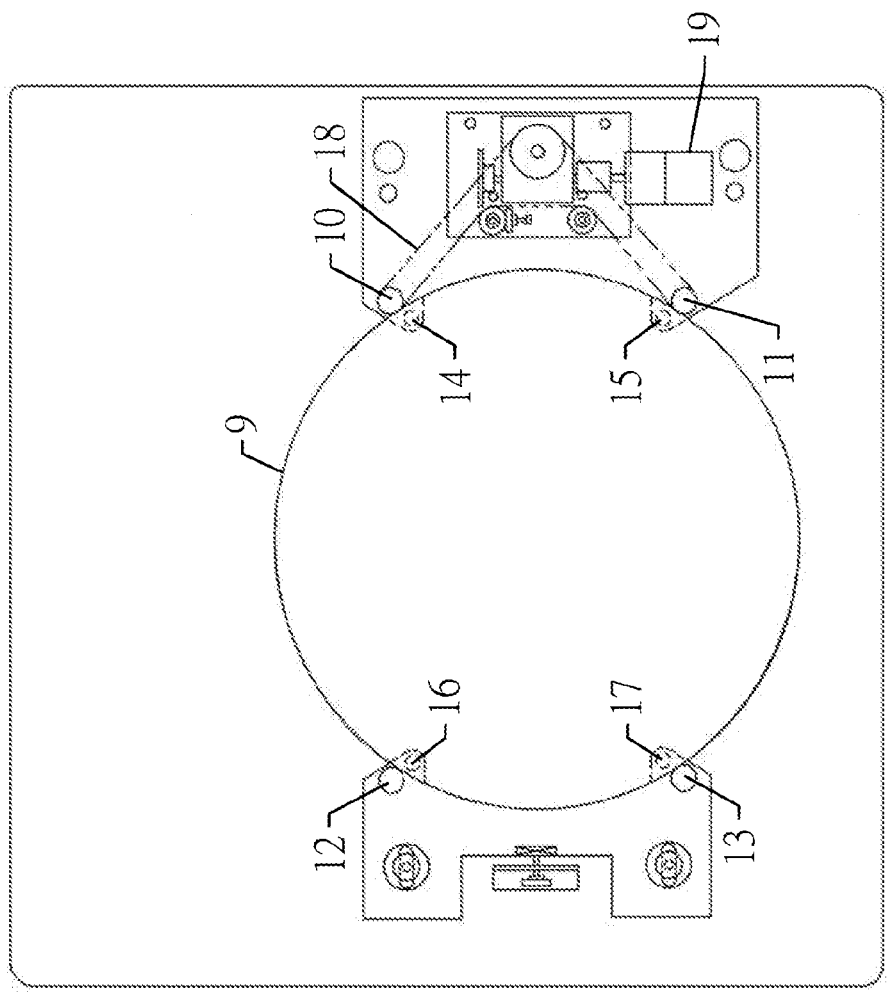
FIG. 2 is a diagram schematically showing a conventional turntable with a centerless light transmission round platter driven by timing pulleys.
Figure 3:
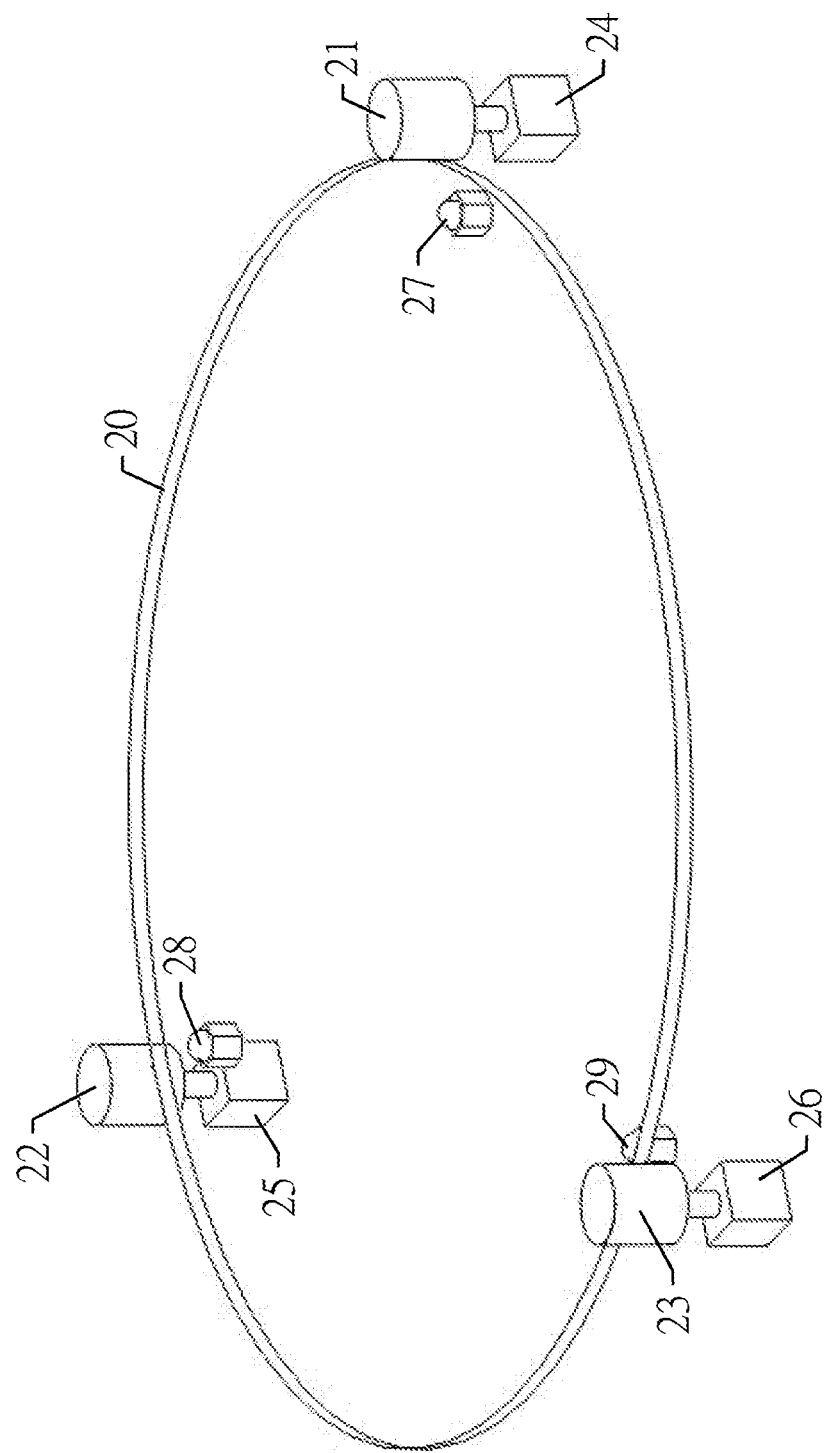
FIG. 3 is a diagram schematically showing a conventional turntable with a centerless light transmission round platter driven by several motors.
Figure 4:
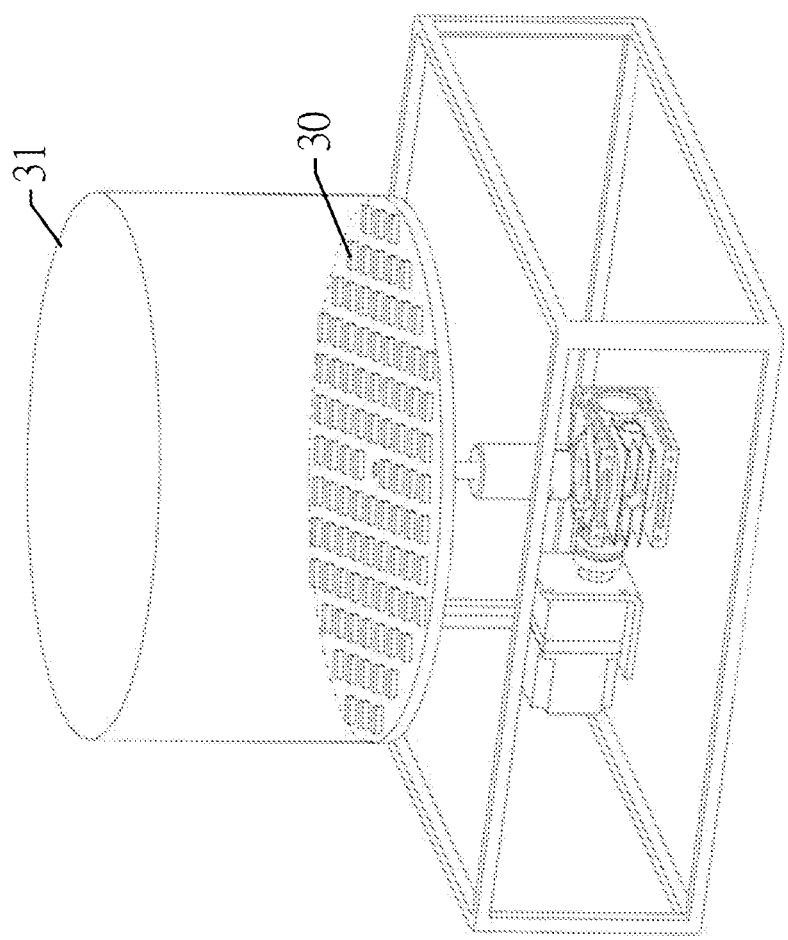
FIG. 4 is a diagram schematically showing a conventional turntable where a light source and a translucent cover are placed on the round platter.
Figure 5:
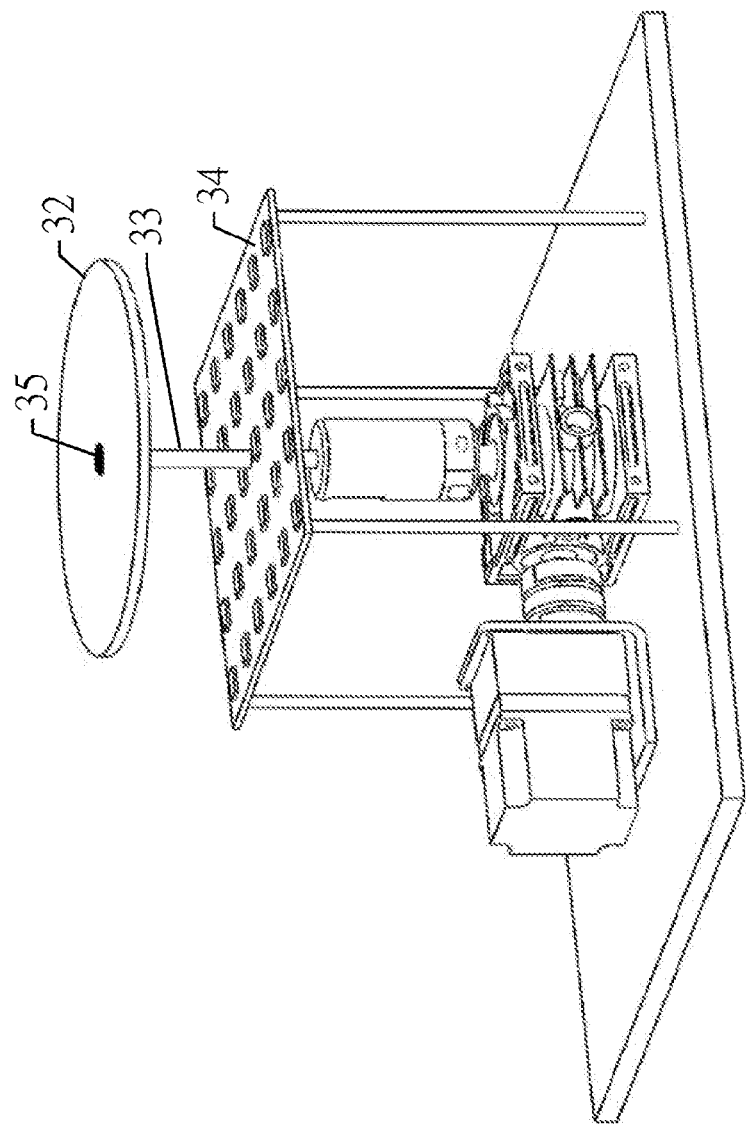
FIG. 5 is a diagram schematically showing a conventional turntable with a light transmission round platter, a transparent spindle and a bottom light.
Figure 6:
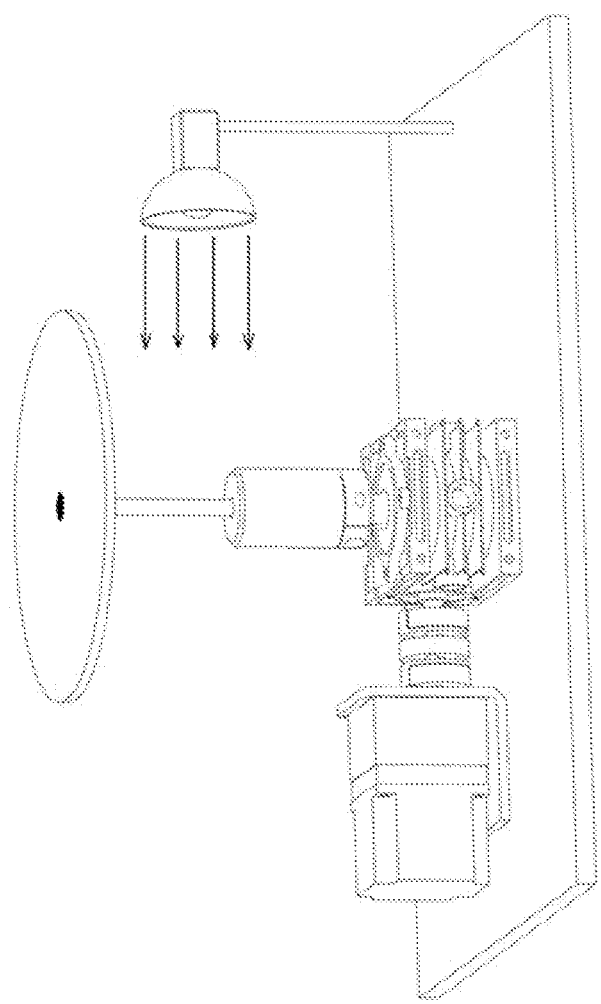
FIG. 6 is a diagram schematically showing a conventional turntable with a light transmission round platter, a transparent spindle and a side light.
Figure 7:
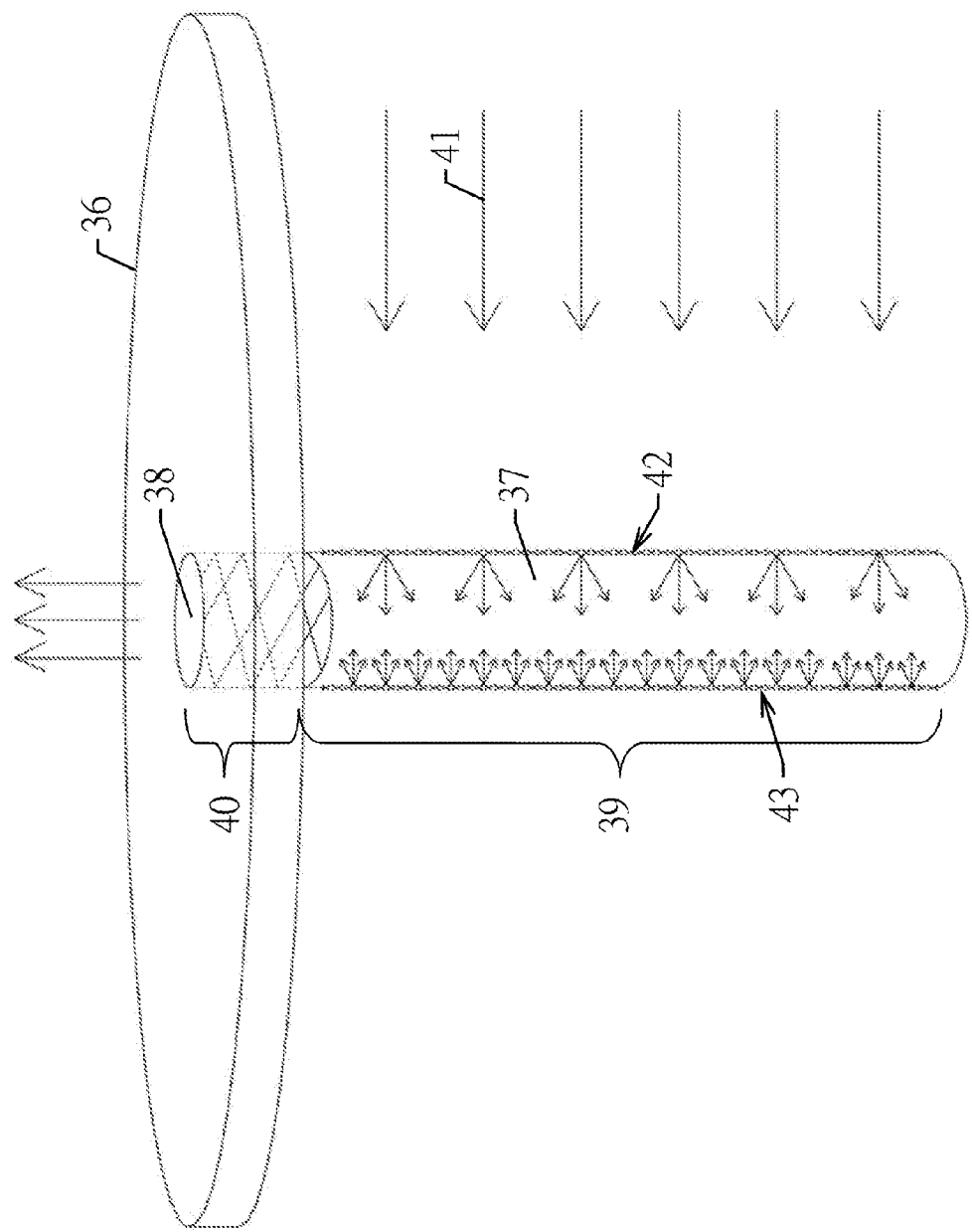
FIG. 7 is a diagram schematically showing the principle of collecting and guiding light in a turntable with a light transmission round platter and a light collection spindle according to one embodiment of the present invention.

Refer to FIG. 7, which is a diagram schematically showing the connection a light transmission round platter and a light collection spindle according to one embodiment of the present invention. The main configuration of the present invention mainly refers to a light transmission round platter 36 and a light collection spindle 37, which are connected at a conjunctive area 38 by gluing or plastic injection forming a one-piece component. A portion of the surface of the light collection spindle 37 is frosted to form a crude surface functioning as a light collection area 39. A portion of the surface of the light collection spindle 37 is unfrosted and remains smooth and transparent, functioning as a light guiding area 40. While a bottom light 41 or a side light 41 illuminates a crude surface 42 of the light collection spindle 37, the direction of the light is changed to generate the first-stage diffusion. While the diffused light reaches another crude surface 43, the second-stage diffusion takes place. The light is diffused back and forth between the crude surface 42 and the crude surface 43. Thus, most of the bottom light 41 or the side light 41 is collected in the light collection area 39 of the light collection spindle 37. The light collected in the light collection area 39 is then reflected and guided by the light guiding area 40 to the conjunctive area 38 to lighten the conjunctive area 38 which is originally dark. In the present invention, the light collection spindle 37 may have a shape of a round column, a triangular prism, a square prism, or a polygonal prism. In the present invention, the light collection spindle 37 may be made of a transparent glass material or a transparent plastic material. The bottom/side light 41 is came from a bottom/side lamp (not shown) respectively.

In the present invention, the light transmission round platter 36 is made of a plastic or glass material, which is transparent or translucent. However, the light collection spindle 37 is made of a transparent plastic or glass material with a frosted portion of the surface. In one embodiment, a translucent round platter may be added on the light transmission round platter 36 such that that the conjunctive area 38 appears less visible during photography.

Figure 8:
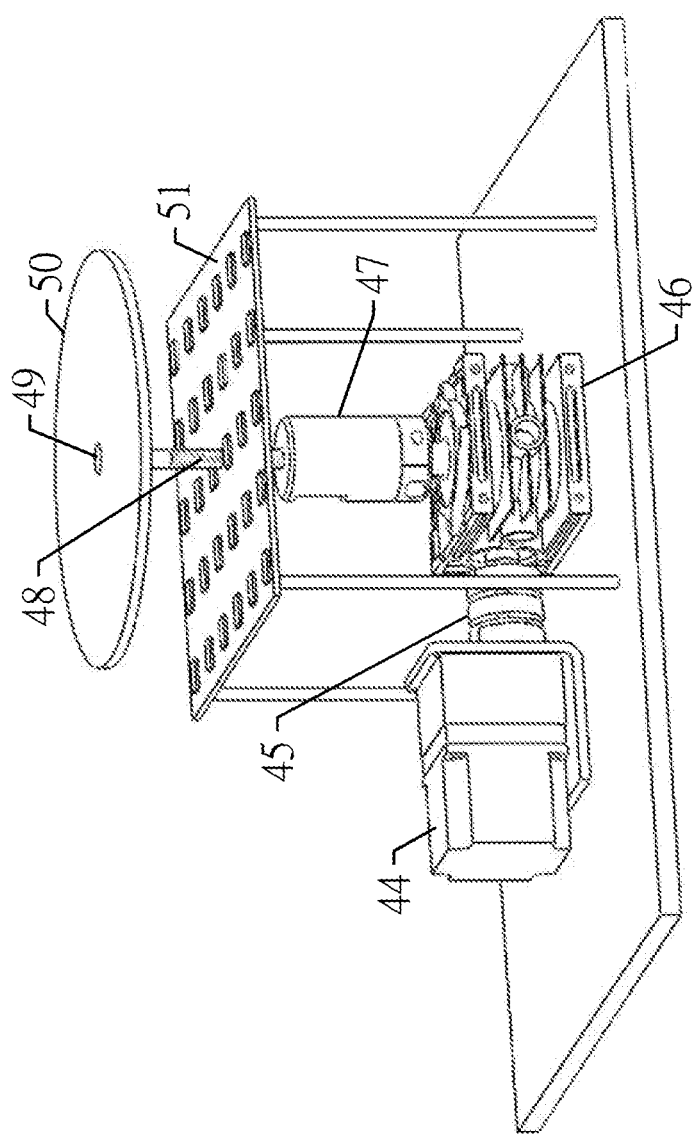
FIG. 8 is a diagram schematically showing the complete structure of a turntable with a light transmission round platter, a light collection spindle and a bottom light according to one embodiment of the present invention.
Figure 9:
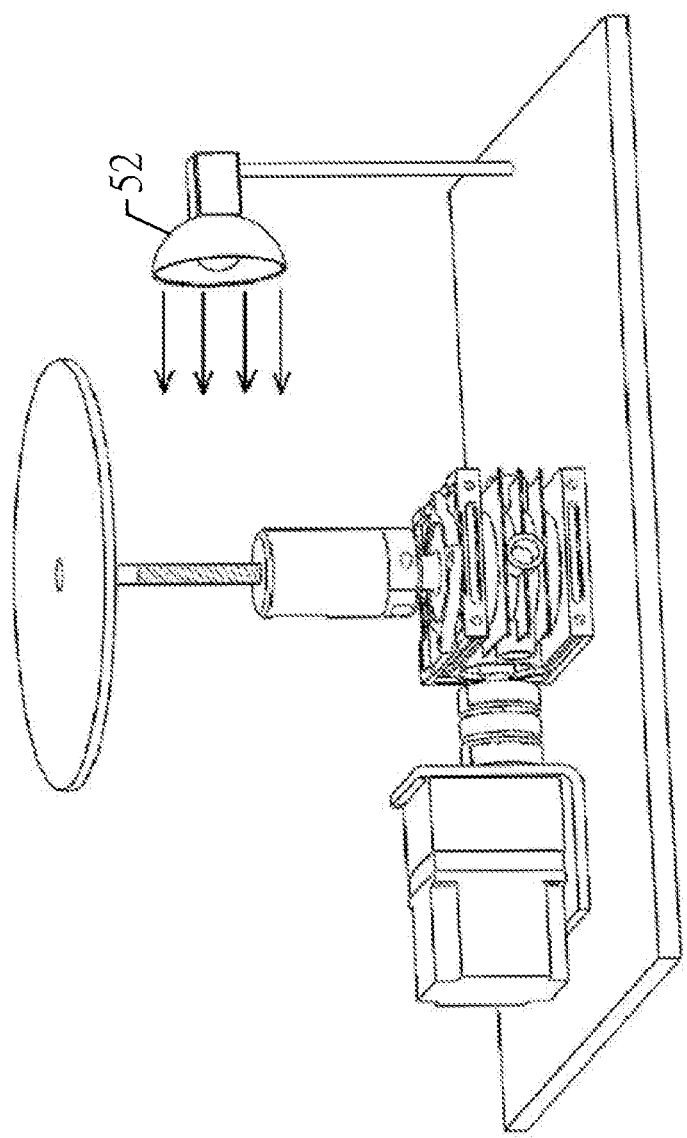
FIG. 9 is a diagram schematically showing the complete structure of a turntable with a light transmission round platter, a light collection spindle and a side light according to one embodiment of the present invention.

Refer to FIG. 8, which is a diagram schematically showing the complete structure of a turntable with a bottom light according to one embodiment of the present invention. In FIG. 8, a motor 44 drives a gear chamber 46 via a coupling device 45 and then drives a spindle holder 47. A light collection spindle 48 with a frosted portion of surface is held by the spindle holder 47. While the spindle holder 47 rotates the light collection spindle 48, the light collection spindle 48 further rotates a light transmission round platter 50, which is connected to the light collection spindle 48 at a conjunctive area 49. The gear chamber 46 is utilized to change the direction of rotation and increase the rotation force and may be optional. A bottom lamp 51 illuminates the partially-frosted light collection spindle 48, especially the portion above the bottom lamp 51. In FIG. 8, the oblique line area is the frosted area functioning as a light collection area. While the incident light from the bottom lamp 51 is collected by the light collection area, the light is reflected and guided to a smooth and transparent light guiding area. Then, the light enters the conjunctive area and lightens the conjunctive area 49. The bottom lamp 51 is fixed to a lower bracket, not rotating together with the motor 44 and the light transmission round platter 50. The light transmission round platter 50 is a platform made of a plastic or glass material, which may be transparent or translucent. The light collection spindle 48 is made of a transparent plastic or glass material with a frosted portion of surface as a light collection area and another smooth and transparent portion of surface as a light guiding area. Refer to FIG. 9, which is a diagram schematically showing the complete structure of a turntable with a side light according to one embodiment of the present invention. The structure in FIG. 9 is basically similar to the structure in FIG. 8 except that the bottom lamp 51 in FIG. 8 is different from the side lamp 52 in FIG. 9.

Figure 10:
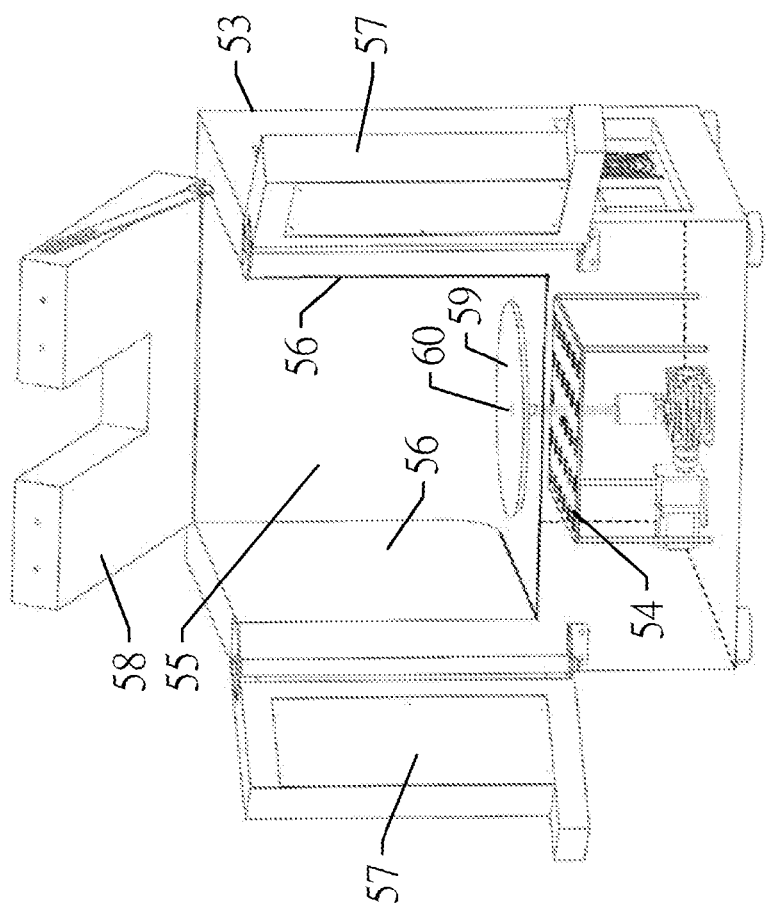
FIG. 10 is a diagram schematically showing a light box device with a complete structure of a turntable embedded therein according to one embodiment of the present invention.

Refer to FIG. 10, which is a diagram schematically showing a light box device with a complete structure of a turntable according to one embodiment of the present invention. In this embodiment, a turntable identical to that shown in FIG. 8 is embedded in a main body of a light box 53. The main body of light box 53 has a bottom lamp 54, a back lamp 55, a side lamp 56, a front lamp 57 and a top lamp 58. When an object to be photographed is placed on a light transmission round platter 59, due to the lightening of the conjunctive area 60 and assistance of the bottom lamp 54, 2D or 3D images with pure-white-background or automatic back-removal can be easily achieved. The side lamp 56, front lamp 57 and top lamp 58 are utilized to illuminate the object to be photographed (not shown in the drawing) placed on the light transmission round platter 59. The arrangement of the side lamp 56 and the top lamp 58 may be optional in the present invention.

Figure 11:
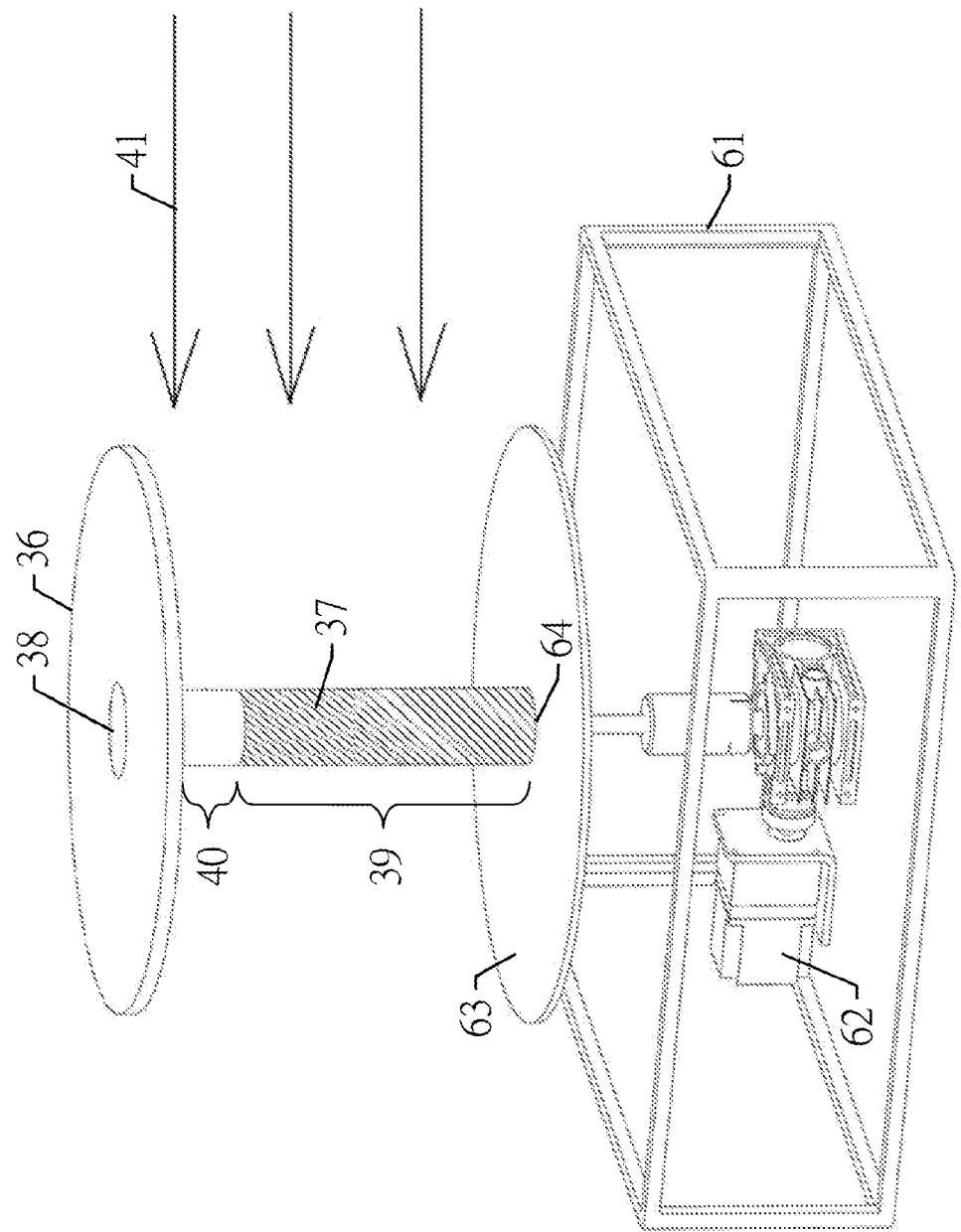
FIG. 11 is a diagram schematically showing that a light transmission round platter and a light collection spindle both are directly installed on a first round platter of a turntable according to one embodiment of the present invention.

Refer to FIG. 11, which is a diagram schematically showing that a light transmission round platter and a light collection spindle. A light transmission round platter 36 and a light collection spindle 37 connected to the light transmission round platter 36 at a conjunctive area 38 are identical to those shown in FIG. 7 and directly installed on a first round platter 63 of a turntable 61. In the turntable 61, a motor 62 directly or indirectly drives a transparent, translucent or opaque first round platter 63 to rotate and thus indirectly rotates the light transmission round platter 36 and the light collection spindle 37, which are installed on the first round platter 63. In the case of the light collection spindle 37 directly installed on the first round platter 63 of the turntable 61, a contact area 64 at a distal end opposite the conjunctive area 38 is connected to the first round platter 63 in a fixed or movable manner by placing, gluing or screwing. While a side light 41 illuminates at the light collection spindle 37, the conjunctive area 38 is lightened.

Figure 12:
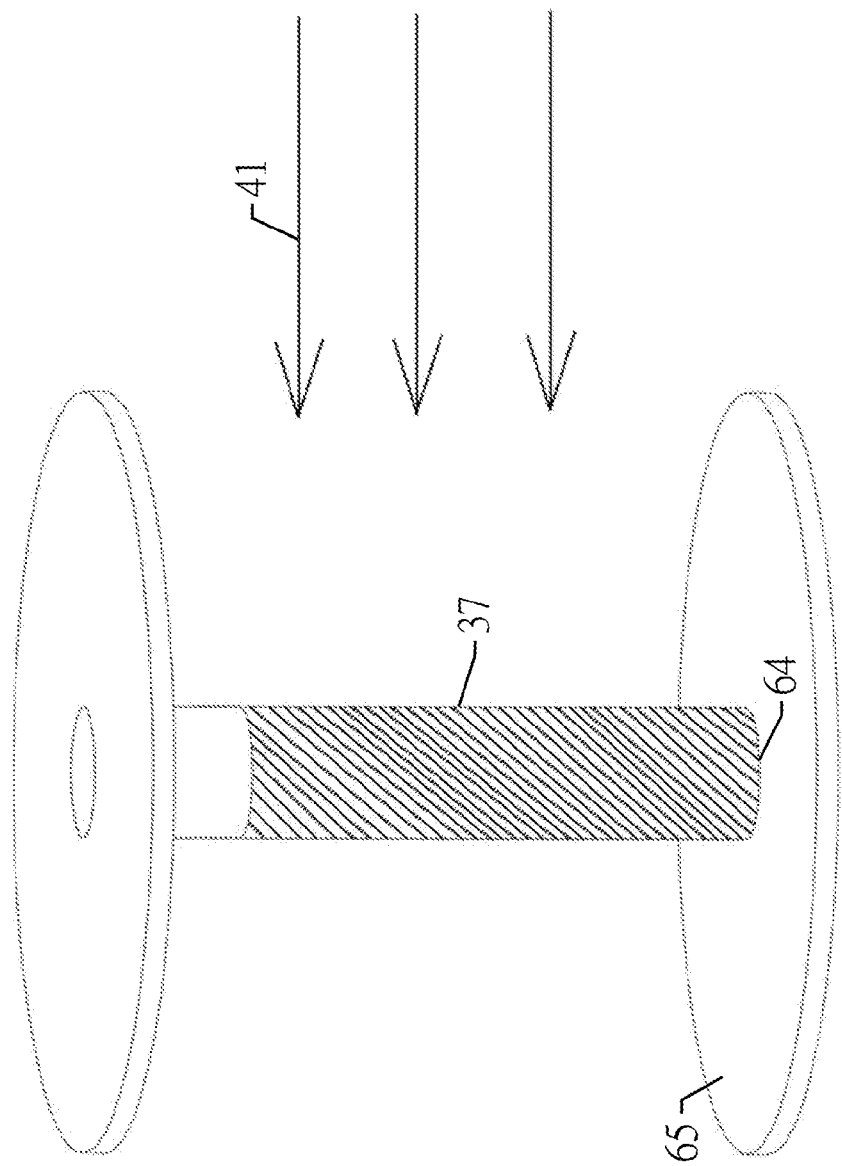
FIG. 12 is a diagram schematically showing that a light transmission round platter and a light collection spindle both are directly installed on a second round platter according to one embodiment of the present invention.
Figure 13:
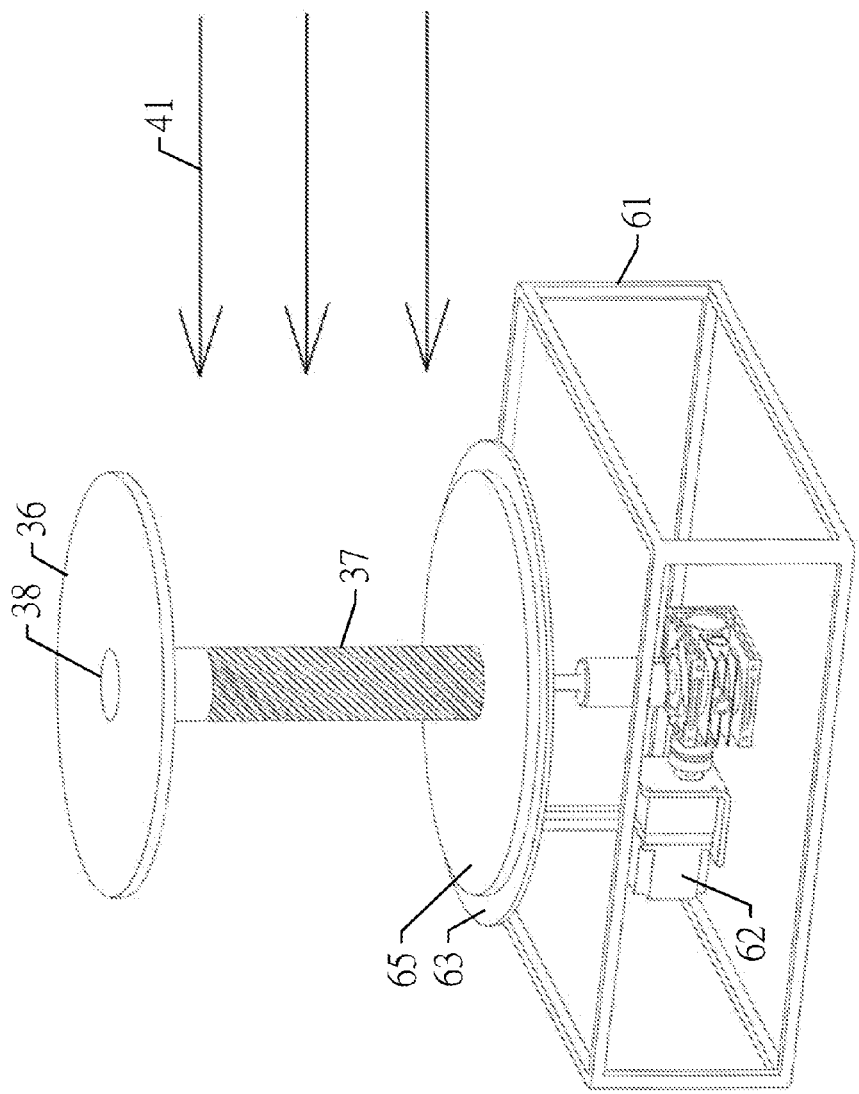
FIG. 13 is a diagram schematically showing that a light transmission round platter and a light collection spindle both are directly installed on a second round platter and that the second round platter is directly placed on a first round platter of a turntable according to one embodiment of the present invention.

Refer to FIG. 12, which is a diagram schematically showing that a light transmission round platter and a light collection spindle are directly installed on a second round platter according to one embodiment of the present invention. In the embodiment shown in FIG. 12, a second round platter 65 is arranged below at the distal end of the light collection spindle 37. The second round platter 65 is connected to a contact area 64 by placing, gluing or screwing. Refer to FIG. 13, which is a diagram schematically showing that a light transmission round platter and a light collection spindle both are directly installed on a second round platter and that the second round platter is directly placed on a first round platter of a turntable according to one embodiment of the present invention. In the embodiment shown in FIG. 13, the second round platter 65 is installed on the first round platter 63 of the turntable 61. In this way, the light transmission round platter 36 and the light collection spindle 37 connected to the light transmission round platter 36 at the conjunctive area 38, can be driven by the motor 62 more stably. Similar to the above-mentioned embodiment, the side light 41 lightens the conjunctive area 38.

Figure 14:
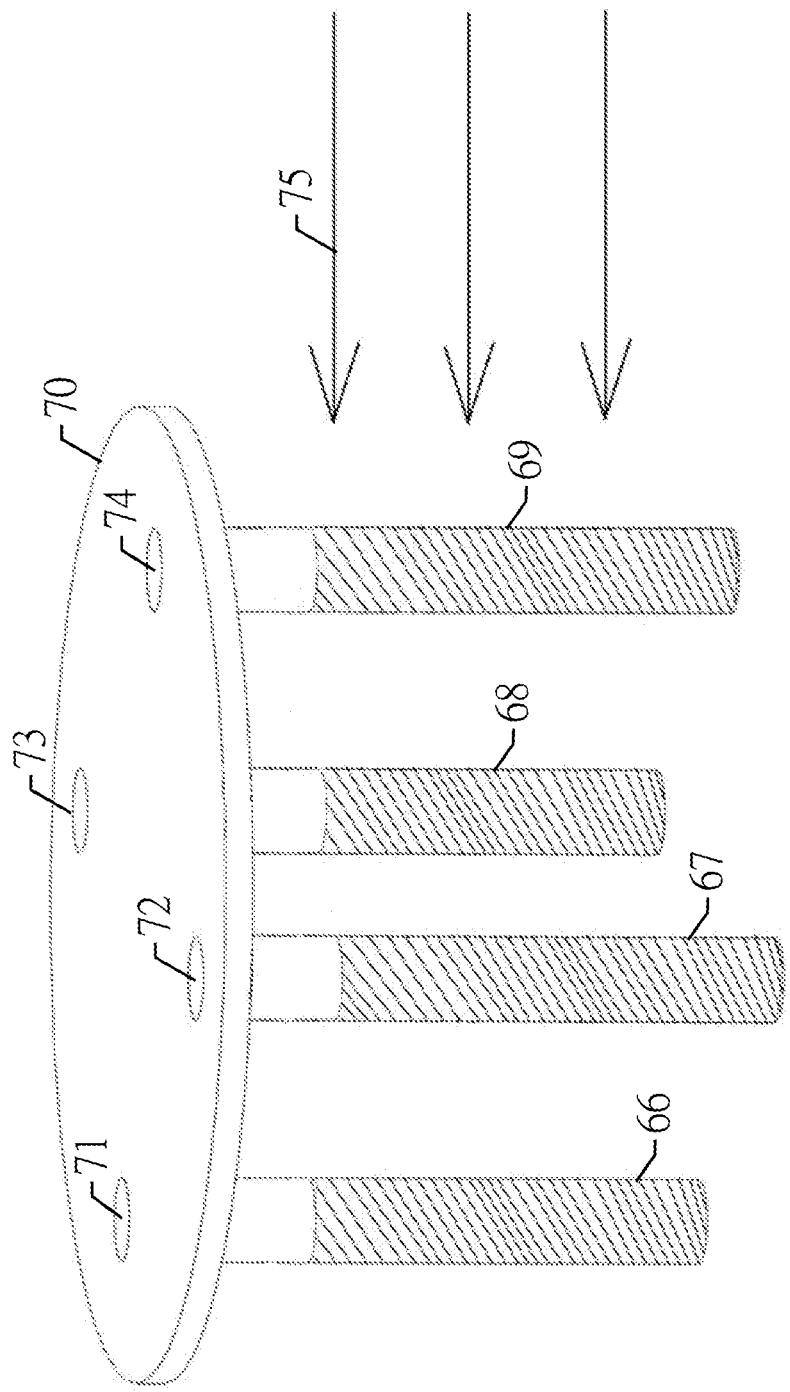
FIG. 14 is a diagram schematically showing that at least two light collection spindles are connected to a light transmission round platter and that a side light illuminates the light collection spindles according to one embodiment of the present invention.

Refer to FIG. 14, which is a diagram schematically showing that at least two light collection spindles are connected to a light transmission round platter and that a side light illuminates the light collection spindles according to one embodiment of the present invention. In FIG. 14, at least two of light collection spindles 66, 67, 68 and 69, which are identical to that shown in FIG. 7, are connected to a light transmission round platter 70 at conjunctive areas 71, 72, 73, and 74. While a side light 75 illuminates these light collection spindles, the conjunctive areas 71, 72, 73, and 74 are lightened.

Figure 15:
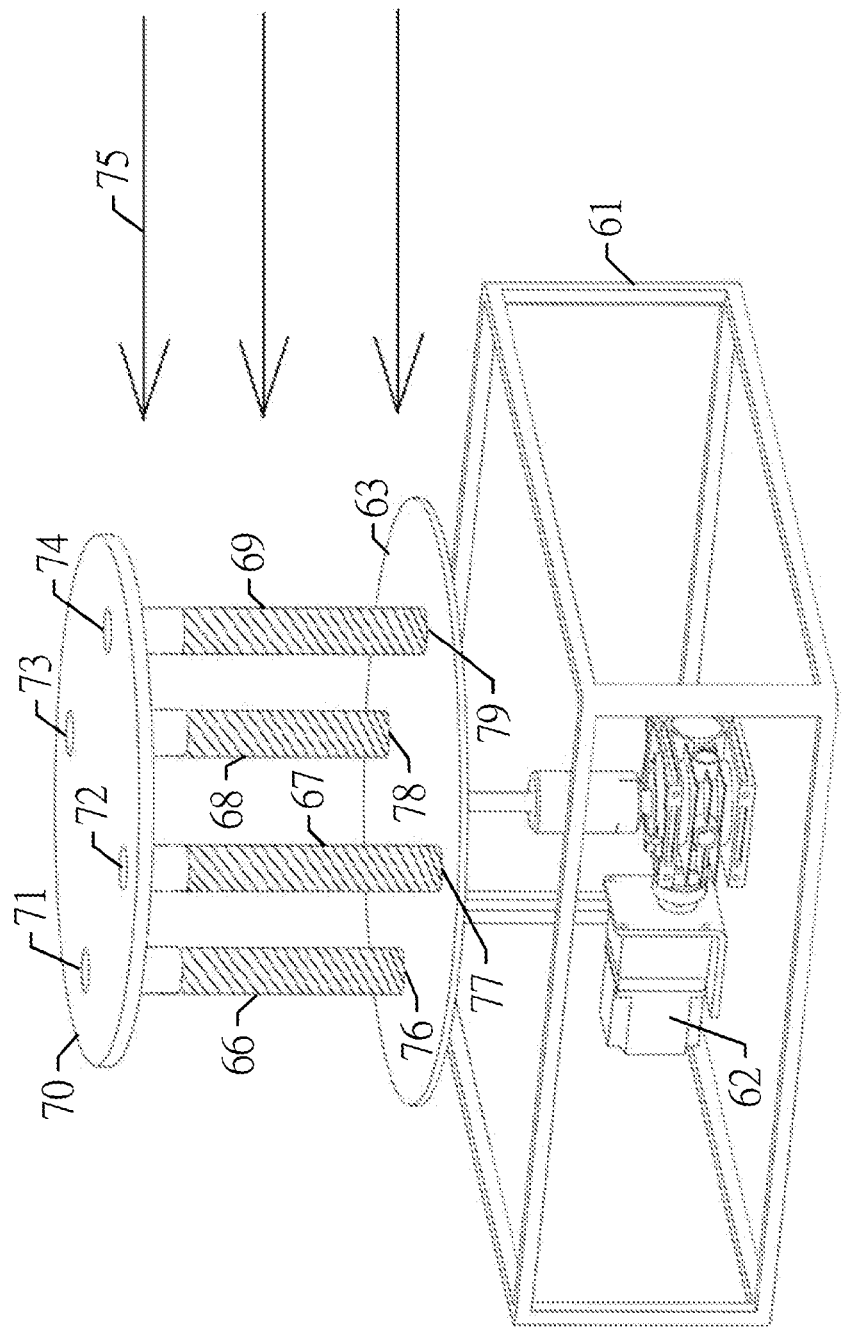
FIG. 15 is a diagram schematically showing that at least two light collection spindles are connected to a light transmission round platter and that distal ends opposite conjunctive areas of light collection spindles are placed on a first round platter of a turntable and that a side light illuminates the light collection spindles according to one embodiment of the present invention.

Refer to FIG. 15, which is a diagram schematically showing that at least two light collection spindles are connected to a light transmission round platter and that distal ends opposite conjunctive areas of light collection spindles are placed on a first round platter of a turntable and that a side light illuminates the light collection spindles according to one embodiment of the present invention. In FIG. 15, the distal ends of the light collection spindles 66, 67, 68 and 69 that are connected to the light transmission round platter 70 respectively at the conjunctive areas 71, 72, 73, and 74 (shown in FIG. 14) are directly installed on the transparent, translucent or opaque first round platter 63 of the turntable 61. The motor 62 directly or indirectly drives the first round platter 63 to rotate and thus indirectly drives the light collection spindles 66, 67, 68 and 69 and the light transmission round platter 70, which are installed on the first round platter 63. While the side light 75 illuminates these light collection spindles 66, 67, 68 and 69, the conjunctive areas 71, 72, 73, and 74 are lightened. Contact areas 76, 77, 78, and 79, which are respectively at the distal ends distal from the conjunctive areas 71, 72, 73, and 74 of the light collection spindles 66, 67, 68 and 69, are connected to the first round platter 63 in a fixed or movable manner by placing, gluing or screwing. In addition to the side light 75, a bottom light (not shown in the drawing), which does not rotate together with the motor 62, may also be utilized to provide illumination.

Figure 16:
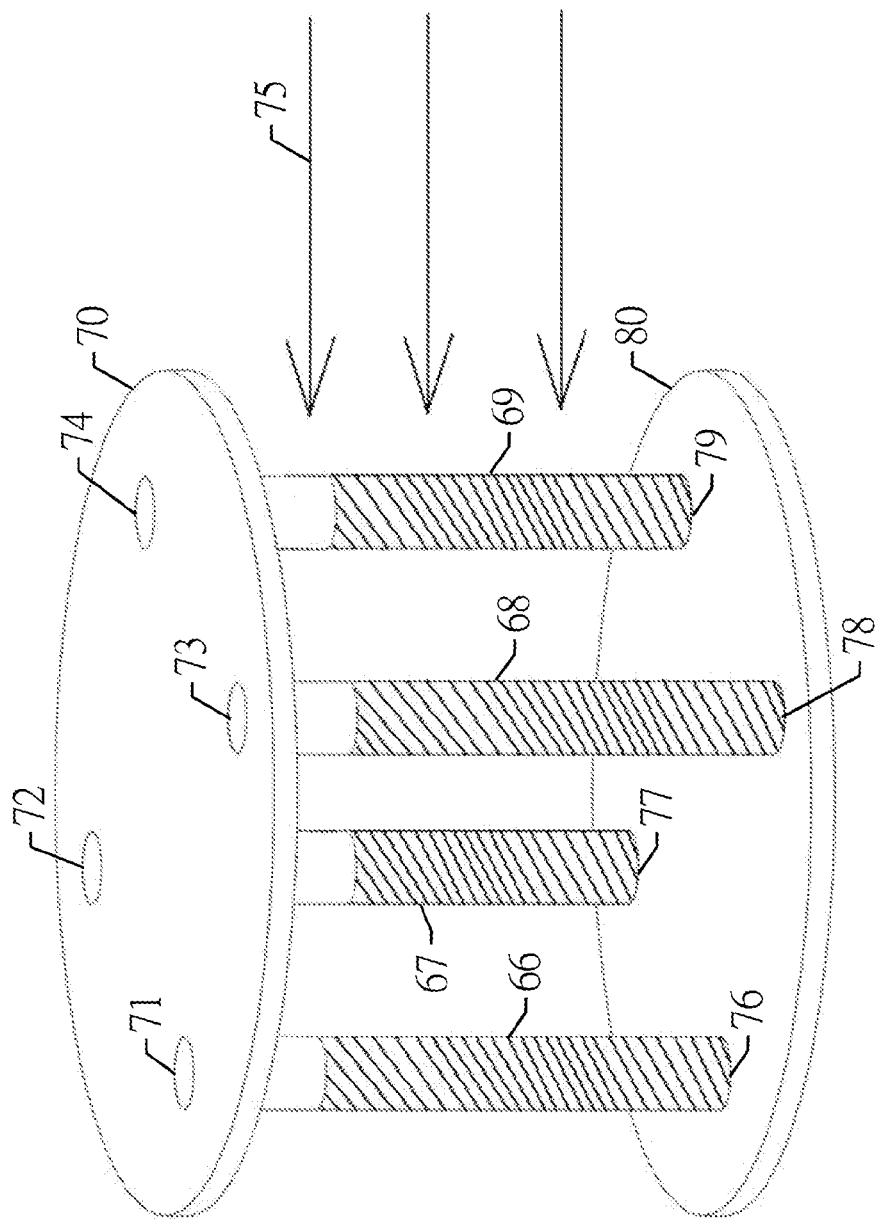
FIG. 16 is a diagram schematically showing that at least two light collection spindles are connected to a light transmission round platter and that distal ends opposite conjunctive areas of light collection spindles are placed on a second round platter according to one embodiment of the present invention.
Figure 17:
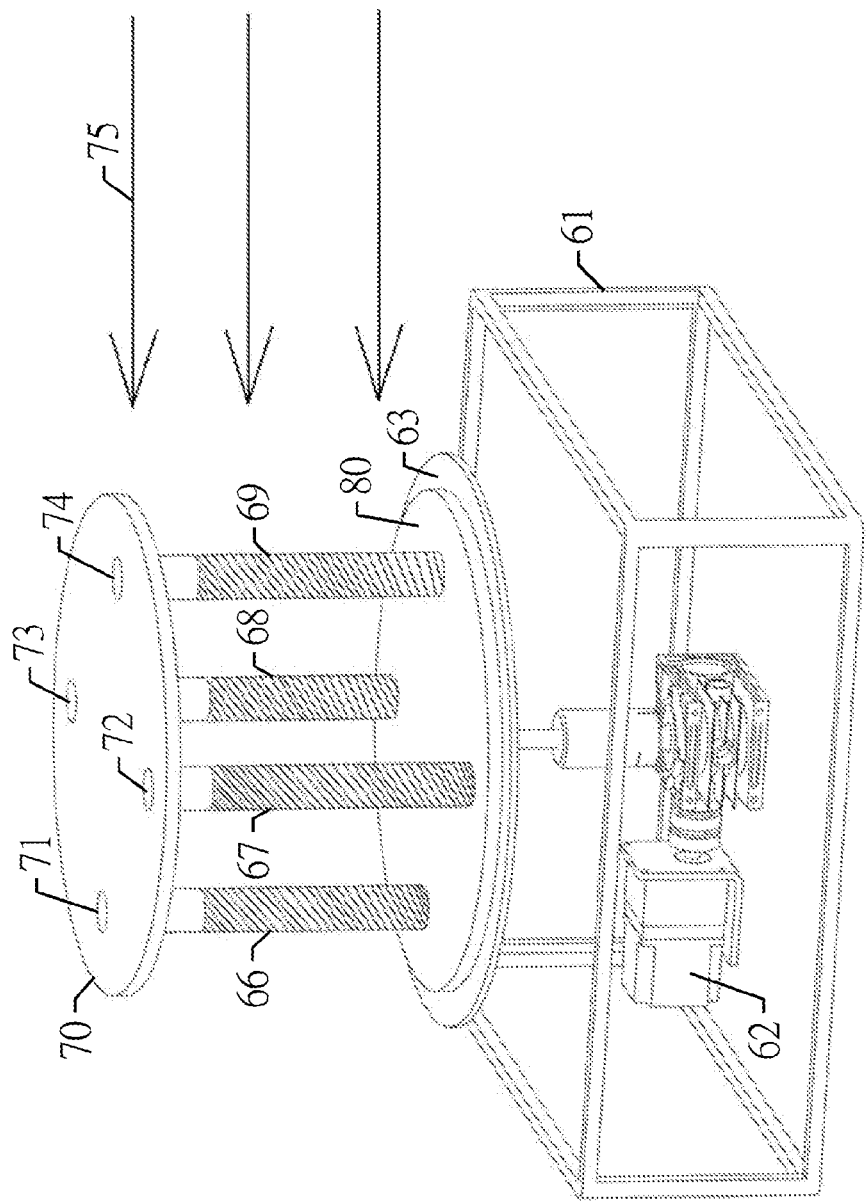
FIG. 17 is a diagram schematically showing that at least two light collection spindles are connected to a light transmission round platter and that distal ends opposite the conjunctive areas of light collection spindles are placed on a second round platter and that the second round platter is placed on a first round platter of a turntable according to one embodiment of the present invention.

Refer to FIG. 16, which is a diagram schematically showing that at least two light collection spindles are connected to a light transmission round platter and that distal ends distal from conjunctive areas of the light collection spindles are placed on a second round platter according to one embodiment of the present invention. In FIG. 16, a second round platter 80 is disposed below the distal ends of the light collection spindles 66, 67, 68 and 69 and connected at contact areas 76, 77, 78, and 79. In FIG. 17, the combination of the light transmission round platter 70, the light collection spindles 66, 67, 68 and 69 and the second round platter 80 shown in FIG. 16 is placed on the first round platter 63 of the turntable 61, wherein the whole second round platter 80 functions as the contact face. The turntable 61 directly or indirectly drives the first round platter 63 to rotate by using the motor 62 and thus indirectly drives the light transmission round platter 70 above the first round platter 63. A portion of surface of each of the light collection spindles 66, 67, 68 and 69 is frosted. While a side light 75 illuminates these light collection spindles, the conjunctive areas 71, 72, 73, and 74 are lightened. In addition to the side light 75, a bottom light (not shown in the drawing), which does not rotate together with the motor 62, may also be utilized to provide illumination. In FIGS. 11-17, all the oblique line areas on the light collection spindles represent the frosted areas. In addition to the side light 41 or 75, a bottom light, which does not rotate together with the motor, may also be utilized to illuminate the frosted areas of the light collection spindles. The light collection spindles 66, 67, 68 and 69 are made of a transparent plastic or glass material with a portion surface thereof frosted. The light collection spindles 66, 67, 68 and 69 may have a round column shape, a triangular prism, a square prism, or a polygonal prism.

While the invention can be subject to various modifications and alternative forms, a specific example thereof has been shown in the drawings and is herein described in detail. It should be understood, however, that the invention is not to be limited to the particular form disclosed, but on the contrary, the invention is to cover all modifications, equivalents, and alternatives falling within the spirit and scope of the appended claims.

What is claimed is:

1. A turntable with a light transmission round platter and a light collection spindle, comprising:
    said light transmission round platter for carrying an object to be photographed;
    said light collection spindle connected to said light transmission round platter at a conjunctive area, wherein a portion of surface of said light collection spindle is frosted with a frosting treatment and functions as a light collection area, and wherein another portion of surface of said light collection spindle remains smooth and transparent and functions as a light guiding area;
    a light source illuminating said light collection area, wherein incident light of said light source is collected inside said light collection area, and reflected in said light guiding area, and the collected light is directed to said conjunctive area to lighten said conjunctive area that is originally dark; and
    a motor directly or indirectly driving said light transmission round platter to rotate.

2. The turntable with a light transmission round platter and a light collection spindle according to claim 1, wherein said motor drives said spindle holder holding said light collection spindle whereby said light transmission round platter that is connected to said light collection spindle at said conjunctive area is indirectly driven to rotate.

3. The turntable with a light transmission round platter and a light collection spindle according to claim 1, wherein said light transmission round platter is made of a plastic or glass material that is transparent or translucent.

4. The turntable with a light transmission round platter and a light collection spindle according to claim 1, wherein said light collection spindle is a transparent plastic spindle or a transparent glass spindle, a portion of surface of said transparent plastic spindle or said transparent glass spindle is frosted, and said light collection spindle has a shape of a round column, a triangular prism, a square prism or a polygonal prism.

5. The turntable with a light transmission round platter and a light collection spindle according to claim 1, wherein said conjunctive area at said light transmission round platter and said light collection spindle is fabricated by gluing or plastic injection forming a one-piece component.

6. The turntable with a light transmission round platter and a light collection spindle according to claim 1, wherein said frosting treatment includes at least one of grinding said light collection spindle with sandpaper, grinding said light collection spindle with a grinding wheel, sandblasting said light collection spindle, and sandblasting a mold of said light collection spindle.

7. The turntable with a light transmission round platter and a light collection spindle according to claim 1, wherein said light source is a bottom light or a side light and illuminates said light collection spindle, and wherein said bottom light does not rotate when said motor and said light transmission round platter rotate.

8. A light box, comprising a main body and a turntable with a light transmission round platter and a light collection spindle according to claim 1, wherein said turntable with said light transmission round platter and said light collection spindle is embedded inside said main body, and wherein said main body has a bottom light and a back light used for assisting in generating an image with pure-white-background or automatic background removal during photography, and wherein said main body also has at least one front light to illuminate said object to be photographed, and wherein said bottom light does not rotate with said motor.

9. The light box according to claim 8, wherein said turntable with said light transmission round platter and said light collection spindle further comprises a first round platter, and wherein said motor drives said first round platter to indirectly rotate said light transmission round platter and said light collection spindle, which are placed on said first round platter, and wherein a distal end of said light collection spindle is distal from said conjunctive area and a contact area of said distal end of said light collection spindle is installed on said first round platter in a fixed or movable manner.

10. The light box according to claim 9, wherein said turntable with said light transmission round platter and said light collection spindle further comprises a second round platter, and wherein said distal end is installed in said second round platter placed on said first round platter.

11. A turntable with a light transmission round platter and at least two light collection spindles, comprising:
said light transmission round platter for carrying an object to be photographed;
said light collection spindles respectively connected to said light transmission round platter at conjunctive areas, wherein a portion of surface of each of said light collection spindles is frosted with a frosting treatment and functions as a light collection area, and wherein another portion of surface of each of said light collection spindles remains smooth and transparent and functions as a light guiding area;
a light source illuminating said light collection areas, wherein incident light is collected inside said light collection areas and reflected in light guiding area, and the collected light is directed to said conjunctive areas and lighten said conjunctive areas that are originally dark; and
a motor directly or indirectly driving said light transmission round platter to rotate.

12. The turntable with a light transmission round platter and light collection spindles according to claim 11 further comprising a first round platter, wherein said motor drives said first round platter to indirectly rotate said light transmission round platter and said light collection spindles, which are placed on said first round platter, and wherein a distal end of each of said light collection spindles is distal from said conjunctive areas and a contact area of said distal end of said light collection spindle is installed on said first round platter in a fixed or movable manner.

13. A turntable with a light transmission round platter and light collection spindles according to claim 12 further comprising a second round platter, wherein said distal ends of each of said light collection spindles are installed in said second round platter placed on said first round platter.

14. The turntable with a light transmission round platter and light collection spindles according to claim 11, wherein said light source is a bottom light or a side light, and wherein said bottom light does not rotate with said motor.

15. The turntable with a light transmission round platter and light collection spindles according to claim 11, wherein each said light collection spindle is a transparent plastic spindle or a transparent glass spindle, and wherein a portion of surface of said transparent plastic spindle or said transparent glass spindle is frosted, and wherein each said light collection spindle has a shape of a round column, a triangular prism, a square prism, or a polygonal prism.

* * * * *